United States Patent [19]

Dickie

[11] Patent Number: 4,467,244
[45] Date of Patent: Aug. 21, 1984

[54] MONITOR BRACKET

[75] Inventor: Robert G. Dickie, Keswick, Canada

[73] Assignee: Northern Technologies, Ltd., Markham, Canada

[21] Appl. No.: 471,123

[22] Filed: Mar. 1, 1983

[30] Foreign Application Priority Data

May 26, 1982 [CA] Canada .................................. 403745

[51] Int. Cl.³ ............................................. H01J 29/96
[52] U.S. Cl. ......................................... 315/3; 315/58; 313/482
[58] Field of Search .......................... 315/3, 56, 58, 71; 313/482; 361/417

[56] References Cited

U.S. PATENT DOCUMENTS 3,612,943 10/1971 Lehmann ................................. 315/3
4,337,412 6/1982 Kawamura et al. .................... 315/3
4,390,809 6/1983 Mitchell et al. ....................... 313/482

Primary Examiner—Eugene R. LaRoche
Attorney, Agent, or Firm—Woodcock, Washburn, Kurtz, Mackiewicz & Norris

[57] ABSTRACT

The invention relates to a display monitor of the kit type which display monitor includes a cathode ray tube (CRT) and video driving circuitry for driving the CRT, the driving circuitry including a monitor circuit board and a flyback transformer. In accordance with the invention, a structural member is provided for mounting the video driving circuitry. The structural member is permanently supportingly attached to the CRT at the corner ears of the CRT. The structural member is a metallic member and is spaced from the neck of the CRT.

9 Claims, 2 Drawing Figures

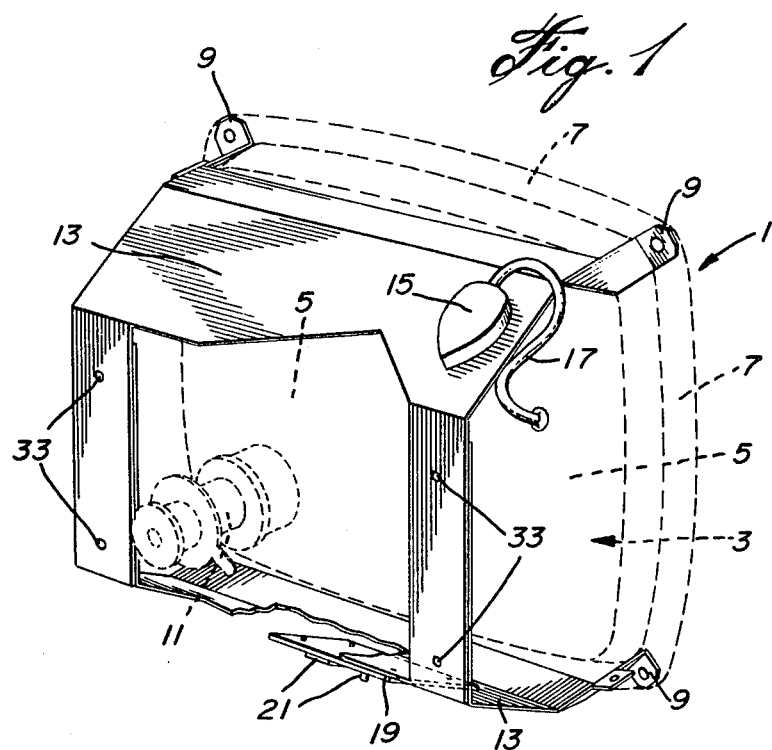
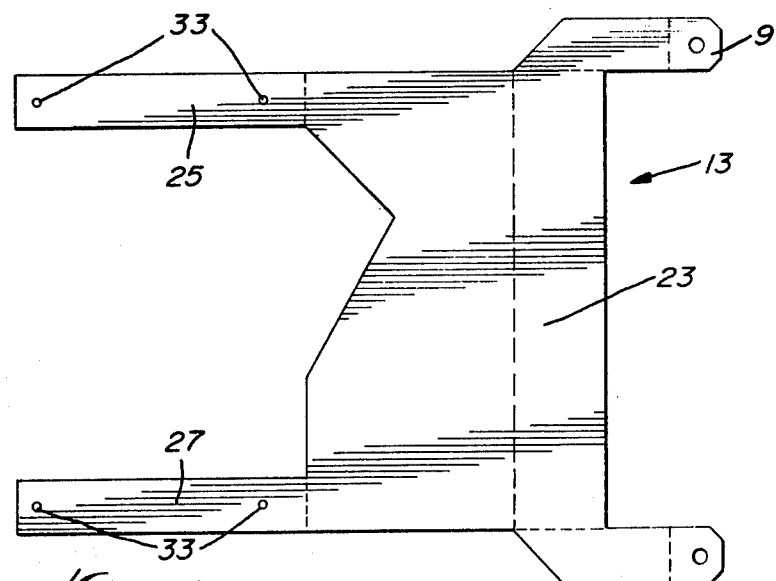

MONITOR BRACKET

BACKGROUND OF INVENTION (a) Field of the Invention

The invention relates to a display monitor of the kit type. More specifically, the invention relates to such a monitor which includes means for mounting the video driving circuitry, the means for mounting being attached to the cathode ray tube (CRT).

(b) Description of Prior Art

The trend in CRT video displays at this time is to provide smaller, more compact, displays so that the displays can be placed on working desks as part of a computer terminal or the like. Each such video display has a display monitor mounted in appropriate cabinetry. The display monitor consists of the CRT and video driving circuitry. The video driving circuitry typically consists of a monitor circuit board as well as a flyback transformer. The flyback transformer has a high voltage connection to the CRT.

The display monitors are basically of two types:
1. kit type; and
2. assembly type.

In the assembly type, the CRT and the video driving circuitry are mounted on structural metal work. The metal work may then be connected to the cabinetry. With the assembly type arrangement, the video testing and alignment can be performed by the display monitor manufacturer with the video driving circuitry mounted in place. The CRT and video driving circuitry are mounted in place by the display monitor manufacturer on the structural metal work, and the entire arrangement is then shipped to the customer with all of the parts mounted in place so that such an arrangement does not require retesting and realignment by the customer. However, the assembly type arrangement requires a good deal of space, so that it is difficult to decrease the size of the CRT video display in which an assembly arrangement is used. In addition, as there is a high voltage connection between the flyback transformer and the CRT, the wire carrying this high voltage connection should not be flexed for safety reasons. Thus, if one wishes to have a CRT video display with a movable screen, it is necessary to move the entire metal work structure to provide such a moving screen. If the CRT alone were moved, then the position of the CRT relative to the flyback transformer would keep changing so that the wire providing the high voltage connection would have to be flexed.

In a kit type arrangement, the display monitor manufacturer typically mounts the monitor circuit board and flyback transformer on a temporary structure such as, for example, a cardboard structure, and video testing and alignment is performed with the video driving circuitry mounted on the temporary structure. When the customer receives the kit arrangement, he removes the video driving circuitry from the cardboard structure and mounts it in the cabinetry. A kit arrangement is characterized by the fact that the CRT is connected directly to the cabinet for structural support, and the video driving circuitry is then mounted at different places in the cabinet. Typically, the monitor circuit board and the flyback transformer are mounted on the floor of the cabinet. (This is contrasted to the assembly type where, as above-mentioned, the CRT and driving circuitry are mounted on a metal structure, and the structure is connected to the cabinetry.) Thus, the position of the video driving circuitry relative to the position of the CRT is different in the customer setup than it is in the display monitor manufacturer's setup, so that retesting and realignment is usually necessary. This increases cost to the customer who must provide manual labour both for installing the video driving circuitry and for then retesting and realigning it. In any case, once the flyback transformer is mounted on the cabinetry, we are still left with the problem of a flexing high voltage lead from the transformer to the CRT in the case of a tilting screen video display.

To somewhat overcome the problems of the above two systems, there is provided a system wherein the monitor circuit board is mounted on the neck of the CRT. The flyback transformer is then also mounted on the monitor circuit board. With this arrangement, testing and alignment performed by the monitor display manufacturer does not have to be redone by the customer as the position of the flyback transformer and the monitor circuit board relative to the CRT remains fixed. In the same way, the problem of a flexing high voltage lead is overcome as the flyback transformer would move with the CRT for a tilting screen display.

However, the neck mounted arrangement also has its problems. Thus, it is structurally not a very sound arrangement as the monitor circuit board is only supported at its edges by the neck of the CRT. In addition, in order to mount the monitor circuit board on the neck of the CRT, it is necessary to supply a custom attachment means, which is expensive to mount and which, in any case, is permanently mounted on the tube. Thus, when a tube fails, both the tube and the mounting means must be thrown out so that very little can be saved.

SUMMARY OF INVENTION

It is therefore an object of the invention to provide a display monitor of the kit type which overcomes the problems of the prior art.

It is a more specific object of the invention to provide such a display monitor which provides means for mounting the video circuitry, the means for mounting being permanently supportingly attached to the CRT.

In accordance with an embodiment of the invention, there is provided, in a display monitor of the kit type which includes a CRT and video driving circuitry for driving the CRT, the improvement comprising mounting means for mounting the video driving circuitry. The mounting means is permanently supportingly attached to the CRT.

BRIEF DESCRIPTION OF DRAWINGS

The invention will now be described in the following text together with the accompanying drawings in which:

FIG. 1 is a perspective view of a display monitor in accordance with the invention; and FIG. 2 illustrates a preferred embodiment of the structural member in accordance with the invention.

DESCRIPTION OF PREFERRED EMBODIMENTS

Referring now to FIG. 1, the display monitor, indicated generally at 1, includes a CRT 3 which has a rear outward surface 5. The rear outward surface 5 includes a bezel rim 7 having four corner ears 9. The CRT also includes a neck portion 11 as is well known.

In accordance with the invention, a structural member 13 is provided for supporting the video driving circuitry. The video driving circuitry is illustrated as a flyback transformer 15, having a high voltage connection 17 to the CRT. The video driving circuitry also includes a monitor circuit board 19 including a plurality of electronic components 21 schematically illustrated in FIG. 1.

As will be appreciated, the structural member illustrated in FIG. 1 is a preferred embodiment, but only one of many which could be designed by one skilled in the art. However, it is important to note that the inner edges of the structural member are spaced from the neck 11 of the CRT. This is because the structural member is preferably a metallic member, and having the metallic member touching the neck of the CRT would cause interference with the performance of the CRT. Accordingly, whatever type of metallic structural member is used, it is important that the structural member should not touch the neck of the CRT.

Accordingly, the structural member could not be supported by the neck of the CRT. Instead, it must be supported by attaching it to the rear outward surface of the CRT. In the preferred embodiment, as illustrated in FIG. 1, the structural member is attached to the ears at the corners of the bezel rim. It will of course be appreciated that this is not the only location at which the structural member could be attached to the CRT.

Turning now to FIG. 2, a preferred form of the structural member is illustrated. As can be seen, the structural member consists of a component carrying portion 23 and legs 25 and 27. Attached at the corners of the component carrying portion are attachment pads 29 and 31.

Each portion as illustrated in FIG. 2 would constitute one-half of the attachment member. A part as illustrated in FIG. 2 is stamped out and a secoond part is also stamped out. The two are reversed relative to one another and screw together through screw holes 33. It can thus be seen that the cost of producing the structural member is very low, and the cost of storing inventory is also low as only one part has to be stored rather than two.

It can be seen that with the inventive display monitor, a very compact arrangement is provided as the flyback transformer and monitor board are mounted close to the CRT versus being mounted on the floor of the CRT as with other kit arrangements. In addition, the structural member is disposed in an area which is not normally occupied in other CRT layouts. Thus, it is using available empty space so that the size of the video display using the inventive display monitor could be reduced without effecting the quality of the entire display.

In addition, manufacturing efficiencies are realized for the display monitor manufacturer as the process of manufacturing the display monitor in accordance with the invention can be easily automated. In addition, it provides a structurally sound arrangement and, especially during the production procedure, the flyback transformer and monitor circuit board are better structurally supported than in the prior art kit style arrangement wherein these elements are carried on a temporary jig. Further, as the spatial relationship between the flyback transformer, monitor circuit board and CRT remains permanent, i.e., it does not change from the spatial relationship as shipped to the spatial relationship as used by the customer, it is not necessary for the customer to perform retesting and realignment procedures.

The metal work can be simple and inexpensive enough to produce so that its cost should not exceed the cost of the temporary jig used in the prior art. Further, the arrangement of the invention is easier for handling and shipping than the prior art kit style monitor displays. It will also be seen that the position of the flyback transformer remains constant relative to the position of the CRT so that the high voltage connecting wire 17 will not be flexed when the CRT is tilted for a tilting display.

Comparing the inventive arrangement with an assembly type display monitor, it can be seen that this requires much less space than does an assembly type arrangement, so that it follows the trend of present requirements much better than the assembly type arrangement.

Although a specific embodiment has been described, this was for the purpose of illustrating, but not limiting, the invention. Various modifications, which will come readily to the mind of one skilled in the art, are within the scope of the invention as defined in the appended claims.

I claim:

1. In a display monitor of the kit type which includes a cathode ray tube (CRT) and video driving circuitry for driving said CRT, the improvement comprising:
   mounting means for mounting said video driving circuitry;
   said mounting means being permanently supportingly attached to said CRT.

2. A display monitor as defined in claim 1 wherein said CRT has a rear outward surface;
   said mounting means being permanently supportingly attached to the rear outward surface of said CRT.

3. A display monitor as defined in claim 2 wherein said rear outward surface includes a surrounding bezel rim;
   said mounting means being permanently supportingly attached to said bezel rim.

4. A display monitor as defined in claim 3 wherein said bezel rim includes ears at the corners of said CRT;
   said mounting means being permanently supportingly attached to said corner ears.

5. A display monitor as defined in claim 4 wherein said mounting means comprises a structural member having a component carrying portion and legs;
   said video driving circuitry being mounted on said component mounting portion;
   the ends of said legs being attached to said corner ears.

6. A display monitor as defined in claim 5 wherein said structural member is spaced from the neck of said CRT.

7. A display monitor as defined in claim 6 wherein said structural member is a metallic member.

8. A display monitor as defined in claim 7 wherein said video driving circuitry comprises a monitor circuit board and a flyback transformer.

9. A display monitor as defined in claim 8 wherein:
   said monitor circuit board is mounted on one side of said neck of said CRT; and
   said flyback transformer is mounted on the other side of said neck.

* * * * *